Nov. 26, 1957  J. B. FORD  2,814,210
CABLE TENSION REGULATOR
Filed Sept. 30, 1954  2 Sheets-Sheet 1
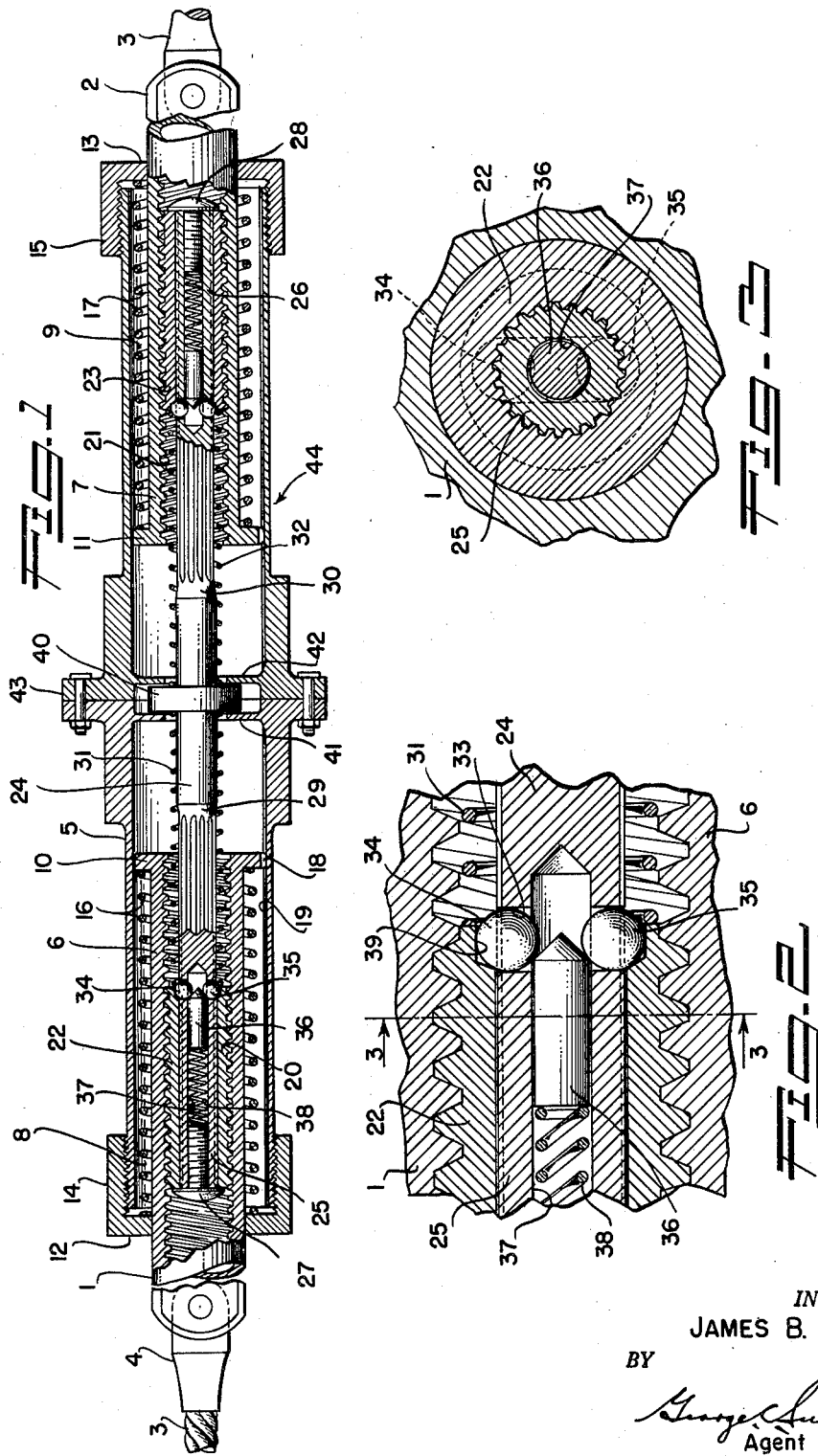
INVENTOR.
JAMES B. FORD
BY
George C. Sullivan
Agent Nov. 26, 1957     J. B. FORD     2,814,210
CABLE TENSION REGULATOR Filed Sept. 30, 1954     2 Sheets-Sheet 2

INVENTOR.
JAMES B. FORD
BY
George Sullivan
Agent

United States Patent Office 2,814,210
Patented Nov. 26, 1957

2,814,210

CABLE TENSION REGULATOR

James B. Ford, Glendale, Calif., assignor to Lockheed Aircraft Corporation, Burbank, Calif.

Application September 30, 1954, Serial No. 459,461

13 Claims. (Cl. 74—501.5)

This invention relates, generally, to remote load cable actuators and, more particularly, to a slack adjusting tension regulator device for use in closed loop cable control systems such as those commonly used on aircraft for moving elevators, rudders, etc.

Due to the characteristic of materials such as metals, to change dimensions with changes in temperature, it is important in closed loop cable control systems to allow for changes in cable length when the system is required to operate at different temperatures. Cable control systems in aircraft obviously come within this category, since the temperature conditions will vary widely with both speed and altitude. Recognizing this, temperature compensating cable tension regulators are now widely used on aircraft.

Since the cable length in closed loop systems also will vary materially with the magnitude of the tension load applied thereto due to stretching and since conventional tension regulators will not compensate for this action, it is also common practice to employ a slack adjuster device as a part of the control loop in addition to the tension regulator to maintain all portions of the cable taut under all operating conditions. This is necessary in aircraft applications at least to avoid banging the otherwise loose cable against adjacent structure such as electrical wiring and hydraulic fluid lines. Also, a loose cable is apt to catch on a bulkhead or the like and prevent proper operation of the control system.

Slack adjusters and tension regulators presently in use in aircraft control systems are separate units which function independently of one another. This not only wastes space and adds unnecessary weight to the control system but also makes the installation costly when compared with the device of this invention wherein both the slack adjusting and tension regulating functions are performed by the same unit.

An object of this invention is to provide a tension regulator device for closed loop cable control systems, and the like, which is capable of also serving as a slack adjuster and which is small in size and light in weight as compared with the conventional separate units performing the same functions.

Another object of this invention is to provide a slack adjusting cable tension regulator device which may be economically manufactured and easily maintained.

Still another object of this invention is to provide a cable tension regulator which will dependably maintain a tension load on a cable in a closed loop system under all operating conditions and which will automatically compensate for all changes in cable length due to such things as temperature effects and overstresssing.

Further and other objects will become apparent from a reading of the following description, especially when considered in combination with the acompanying drawing wherein like numerals refer to like parts.

In the drawing:

Figure 1 is a fragmentary sectional side view of the combination cable tension regulator device of this invention;

Figure 2 is an enlarged sectional side view of the ball-type sleeve latching mechanism;

Figure 3 is a view taken on line 3—3 of Figure 2; and

Figure 4:
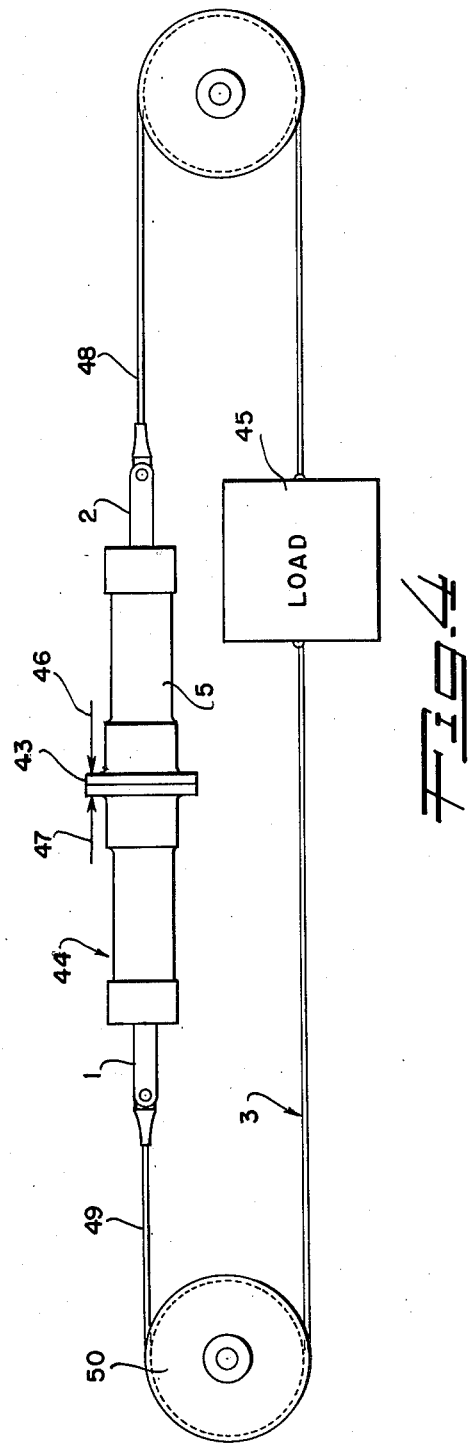
Figure 4 is a schematic view showing a typical closed loop cable control system which incorporates the slack adjusting tension regulator device of this invention.

Referring to Figure 1, the device 44 includes a pair of like cable connectors 1 and 2, each of which connect with a cable 3 through a suitable clevis 4. The inner ends 6 and 7 of each cable connector 1 and 2 is inserted in tubular housing 5 which supports the connectors in an opposed relationship allowing only relative axial movement therebetween. Annular chambers 8 and 9 are formed within housing 5 between the housing and each cable connector 1 and 2 by means of outwardly directed flanges 10 and 11 on the inner ends of the connectors and by inwardly directed flanges 12 and 13 on caps 14 and 15 respectively, which threadedly engage the ends of housing 5. Compression springs 16 and 17 are located within annular chambers 8 and 9, respectively, and act between the housing and the associated cable connector 1 or 2, urging the same toward one another for maintaining the desired static tension load on cable 3 in a closed loop cable system such as shown in Figure 4. By simply turning caps 14 and 15 in or out, the static tension load on the cable may be adjusted to the proper value.

To avoid relative rotation between housing 5 and connectors 1 and 2, a key 18 may be formed on each flange 10 and 11, as shown in Figure 1, which engages a keyway 19 formed in the housing.

With the construction so far described it is obvious that by selecting springs 16 and 17 which have a low spring rate, the static tension load on cable 3 in the loop will remain substantially constant regardless of the surrounding temperature since as the cable length changes, cable connectors 1 and 2 will move relative to housing 5 an amount sufficient to allow for the change in cable length without materially changing the compression load of the springs. However, loads applied to the cable system will compress springs 16 and 17 rather than provide positive actuation of the controlled element. To avoid this, it is necessary to limit the action of springs 16 and 17. Such is accomplished by providing axial bores 20 and 21 in cable connectors 1 and 2 respectively, which extend from the inner ends thereof within housing 5 to a bottoming location near the opposite end of the connector adjacent clevis 4. Bores 20 and 21 have a total depth at least as great as the maximum anticipated change in cable length and are threaded in the opposite screw sense, as indicated in Figure 1, for threadedly engaging sleeves 22 and 23. A shaft 24, concentrically arranged within housing 5, is slidably received by sleeves 22 and 23 at either end thereof. The outer ends 25 and 26 of shaft 24 which engage sleeves 22 and 23 are splined, as best shown in Figure 3, to prevent relative rotational movement between the sleeves and shaft 24 while allowing limited axial movement of the sleeves relative to the shaft. Sleeve retaining bolts 27 and 28 threadedly engage the outer end of shaft 24 and provide a stop which limits the relative movement of sleeves 22 and 23 relative to the shaft in an outwardly or cable loosening direction. Movement of sleeves 22 and 23 relative to shaft 24 in an inwardly or cable tightening direction wherein the sleeves move toward one another is limited by ridges 29 and 30 formed in shaft 24.

In the static condition when there is no pilot control force being applied to the cable system it is desirable to maintain sleeves 22 and 23 in their outermost positions relative to shaft 24, as shown in Figure 1, for reasons which will hereinafter become more apparent. This urging of sleeves 22 and 23 to their extreme outward positions is accomplished by springs 31 and 32 respectively which act between shaft 24 and the associated sleeve as well as by a retractable ball detent arrangement most clearly shown in Figure 2. A transverse bore 33 is formed in shaft 24 adjacent each sleeve 22 and 23 at a distance inwardly from the ends of the shaft which is slightly less than the length of the sleeves. A pair of generally spherical balls 34 and 35 are carried within each bore 33 and are urged outwardly by a wedge member 36 carried within an axial bore 37 formed in the ends 25 and 26 of the shaft. As may be seen in Figure 1, bore 37 is plugged at the outer end of the shaft by sleeve retaining bolts 27 and 28. A small coil spring 38, carried within bore 37 at each end of the shaft, acts between the bolt and the associated wedge member 36 for urging the latter against balls 34 and 35. An annular groove 39, formed on the inner end of sleeves 22 and 23, allows the balls to project outwardly from shaft 24 to provide a certain resistance load tending to prevent relative axial movement between shaft 24 and sleeves 22 or 23. When a force of sufficient magnitude is supplied to balls 34 and 35 by the associated sleeve 22 or 23, wedge member 36 will retract, compressing spring 38, and allowing the balls to also retract whereby the sleeve is free to move axially inwardly relative to the shaft except for the relatively small return force exerted by the associated compression spring 31 or 32.

Shaft 24 is provided with a clutch plate 40 formed integral with the shaft as a radial flange at a location substantially midway between the ends thereof. A pair of radially inwardly directed flanges 41 and 42 are rigidly carried by housing 5 and spaced apart a distance slightly greater than the width of brake plate 40. Flanges 41 and 42 engage brake plate 40 on either side thereof and prevent rotation of shaft 24 relative to housing 5 only when a force is being applied to the cable system which unbalances the static tension load on the cable and causes relative movement between housing 5 and shaft 24.

A flange 43, as shown in Figures 1 and 4, is formed integral with housing 5 as a means for connecting the cable control system with a suitable pilot actuated lever mechanism (not shown) for applying a force to the cable control system and effecting movement of the controlled element 45.

Referring now to Figure 4, a simplified aircraft cable control system may consist of cable 3, the tension regulating and slack adjusting device 44, the load or resistance element 45, which element may be an elevator, rudder, or the like, and a sufficient number of pulleys 46 for directing cable 3 along a desired path from tension regulator and slack adjuster device 44 to the remotely located load or resistance element 45. As shown in Figure 4, the pilot force to be transmitted to the load or resistance element 45 is applied to flange 43 in an axial direction relative to housing 5, as indicated by arrows 46 and 47, to effect axial movement of the housing whereby a tension load is applied to cable segment 48 or 49, depending upon the direction of the pilot force. This causes corresponding movement of the element 45 in the control system.

When no pilot control force is being applied to housing 5 through flange 43, the device will maintain a substantially constant tension load on cable 3. For example, if the temperature changes, causing the cable to shorten in length, compression springs 16 and 17, as best shown in Figure 1, will allow cable connectors 1 and 2 to slide outwardly relative to housing 5 a sufficient distance to compensate for the change in cable length. As the cable connectors slide outwardly, sleeves 22 and 23, which threadedly engage the connectors, are urged to rotate, which rotation causes a corresponding movement of shaft 24 until the new cable connector position is reached, at which time the sleeves and the connecting shaft will stop rotating. Since sleeves 22 and 23 are threaded in the opposite screw sense, rotation in one direction will allow both connectors to move outwardly and away from each other and rotation in the opposite direction will allow both connectors to move toward one another. By selecting the proper lead angle for the threads on sleeves 22 and 23, rotation of shaft 24 may be automatically accomplished by spring 16 and 17 acting through cable connectors 1 and 2. A force of very small magnitude, say, in the neighborhood of 3 or 4 pounds, will be sufficient to effect rotation of shaft 24 to correct the static cable tension load.

With the retractable detent latch provided by balls 34 and 35 acting in combination with springs 31 and 32, the force required to cause rotation of sleeves 22 and 23 and shaft 24 is maintained always less than the force required to cause axial relative movement between the sleeves and shaft 24. Therefore, regulation of the static tension load on cable 3 is effected exclusively by rotation of shaft 24 while sleeves 22 and 23 remain in the extreme position relative to the shaft abutting retaining bolts 27 and 28. Since the cable loads on connectors 1 and 2 are substantially equal, there is no tendency to produce relative axial movement between shaft 24 and housing 5.

When a control force is applied to housing 5 in the direction indicated by arrow 46 in Figure 4, for example, tension in cable segment 48 increases and tension in cable segment 49 decreases due to the resistance of load 45. This causes sufficient relative movement between housing 5 and shaft 24 to effect engagement of flange 42 with brake 40 to prevent rotation of shaft 24. Since the shaft is held against rotation and since sleeve 23 is in the extreme axial position abutting retainer bolt 28, a direct and rigid mechanical link is completed between housing 5 and connector 2, bypassing compression spring 17. As the tension load on cable segment 48 increases, causing the same to stretch, cable segment 49 will tend to slacken. Thus, the cable load on connector 1 decreases, causing compression spring 16 to apply a force to sleeve 22 urging the same to either move axially inwardly or rotate. Since shaft 24, which connects with sleeve 22 prevents rotation of the sleeve while a pilot force is being applied to housing 5, sleeve 22 can only move axially inwardly from the position abutting retaining bolt 27 to a new position intermediate of the two extreme sleeve positions on shaft 24. This movement of sleeve 22 will continue until a balance of forces is again obtained between compression spring 16 and cable segment 49. The axial movement of sleeve 22 relative to shaft 24 will occur the instant the force differential between that exerted by spring 16 and that exerted by cable segment 49 reaches a value sufficient to cause balls 34 and 35 to retract as well as overcome the small sleeve return load applied by spring 31.

When the control force applied to housing 5 is withdrawn, flange 42 releases brake 40 and allows free rotation of shaft 24, and at the same time reduces the high tension load in cable segment 48. As the high tension load is removed, cable segment 48 returns to its original length, or substantially so. Since the cable length decreases when the control force is removed, the tension load on cable segment 49 starts to increase, causing connector 1 to be urged outwardly toward its original position for maintaining a balance of forces between compression spring 16 and cable segment 49. As cable connector 1 returns, sleeve 22 likewise returns to the extreme position shown in Figure 1, as urged by spring 31. So long as the force exerted by spring 31 is greater than the force required to rotate the shaft and sleeves, sleeve 22 will always return to the latched position rather than seek a balance of forces by rotation of shaft 24.

If cable 3 changes in length (takes on a permanent set)

while the control force is being applied due to overstressing or changes in temperature, or other causes, compression springs 16 and 17 will effect rotation of shaft 24 as soon as the control force is removed to relocate connectors 1 and 2 relative to housing 5 and restore the desired tension load in the cable system.

A control force applied to the cable system through housing 5 in the direction indicated by arrow 47 in Figure 4 will effect movement of the load or resistance element 45 in the opposite direction as compared with the situation when the control force is applied in the direction indicated by arrow 46. At the same time, cable 3 will always be held under a tension load by the slack adjuster and tension regulator device in the same manner as described hereinabove except that slack adjustment will be accomplished by compression spring 17 rather than by compression spring 16.

The detent latch, which incorporates retractable balls 34 and 35, provides means for positively locating sleeves 22 and 23 in their respective outwardmost positions abutting the retaining bolts on the ends of shaft 24, however, they are not absolutely essential to the operation of the device. The design parameter, wherein the force with which sleeves 22 and 23 are urged into their respective outwardmost positions must be greater than the axial force required to be applied by connectors 1 and 2 for effecting rotation of the sleeves and shaft 24 when brake plate 40 is disengaged from flanges 41 and 42, may be met by the use of springs 31 and 32 alone.

The relative axial movement between shaft 24 and cable connectors 1 and 2 for effecting slack adjustment may obviously be accomplished by the use of sleeves carried on the cable connectors rather than on shaft 24 as shown in the drawing. The particular detail construction used in the tension regulator will, of course, depend upon design considerations within the scope of the principles involved in this invention.

While a specified embodiment of the device has been shown and described, it is to be understood that certain alterations, modifications and substitutions may be made to the instant disclosure without departing from the spirit and scope of the invention as set forth in the appended claims.

I claim:

1. A slack adjusting and tension regulator device for aircraft control cable systems, and the like, comprising a tubular housing, a pair of opposed cable connectors slidably received by said tubular housing at either end thereof, spring means acting between said housing and each said connector and applying the desired tension load on the cable through said connectors, the inner ends of said connectors being threaded in the opposite screw sense, sleeves threadedly engaging said connectors at the inner ends thereof, the lead of said threads being such that rotation of said sleeves may be effected by a relatively small axial force applied between the sleeve and its associated connector, a shaft concentrically arranged relative to said housing and slidably engaging said sleeves and allowing only limited axial movement thereof relative to the shaft, a transverse brake plate carried on said shaft, circumferential flanges carried by said housing on either side of said brake plate for engaging the latter and preventing rotation of said shaft and sleeves when applying a control force to the device through said housing whereby the control force is applied directly to one of the cable connectors, bypassing said spring means, and means acting between said shaft and said sleeve and urging the latter into an extreme position relative to the shaft with a force only slightly greater than the force required to rotate said sleeves and shaft whereby cable slack is eliminated only by axial movement of said sleeve relative to the shaft and cable tension is regulated only by rotation of said shaft.

2. A slack adjusting tension regulator device for aircraft control surface actuators, and the like, having a closed loop cable control system comprising, a pair of cable connectors connecting with the cable and forming an integral part of the closed loop control system, a housing slidably engaging said connectors and allowing only limited axial movement therebetween, spring means acting between each said connector and said housing and applying the desired static tension load on the cable, a pair of sleeves each threadedly engaging a cable connector, a shaft engaging both sleeves and allowing only limited relative axial movement therebetween, a second spring means acting between said shaft and each said sleeve for normally urging the latter to an extreme position relative to the shaft and allowing rotational movement of said shaft and sleeve in response to an axial force applied by the first mentioned spring means through said connectors whereby the spacing between said connectors may change as required to maintain a substantially constant static tension load on the cable, means carried by said housing for applying an axial force to said device for moving said cable in either direction, and means resisting rotation of said shaft only while said force is applied to said device whereby the force is transmitted directly to one of said connectors while the other connector is free to move more axially through relative axial movement between its associated sleeve and said shaft against the action of said second spring means for maintaining a tension load on all segments of the cable even though the same may stretch under load.

3. A cable tension maintainer for use in closed loop cable systems comprising a tubular housing, a pair of opposed cable connectors carried by said housing and allowing limited axial movement relative thereto, spring means acting between said housing and each said connector for maintaining a tension load on the cable, a pair of sleeves each threadedly engaging a cable connector, the threads on said sleeves being in the opposite screw sense and having a long lead angle whereby a small axial force exerted on the sleeves by said connectors will tend to cause sleeve rotation, a shaft engaging both said sleeves and allowing only axial movement thereof relative to the shaft, means carried by said housing and allowing rotation of said shaft and sleeves only when the cable tension force exerted on said connectors is substantially equal, a second spring means acting between said shaft and said sleeves and urging the latter to an extreme position relative to the shaft with a force greater than the force required for said connectors to rotate said shaft and sleeves whereby cable slack is eliminated by axial movement of one of said sleeves relative to the shaft and cable tension is regulated by rotation of said shaft, and latch means carried by said shaft and allowing axial movement of said sleeves relative to the shaft only in response to a force exerted by said sleeve which exceeds a predetermined value whereby to assist the action of said second spring means in maintaining said sleeves in an extreme position relative to the shaft.

4. A cable tension maintainer for use in closed loop cable control systems, and the like, comprising a housing, a pair of cable connectors movably carried by said housing, spring means acting between said housing and said connectors for maintaining a nearly constant static tension load on the cable system, and shaft means carried by said connectors and providing a rigid mechanical connection between said housing and only one of said cable connectors when the cable force exerted on said one connector is greater than the force exerted on the other connector whereby a tension load is always maintained on said other connector even through the cable may change in length.

5. A cable tension maintainer for use in closed loop cable control systems and the like comprising, a generally tubular housing, a pair of opposed cable connectors slidably received by opposite ends of said housing for limited axial movement relative thereto, flanges carried on said housing and on said cable connectors and forming an annular chamber between the housing and each said cable connector, a low rate mechanical compression spring carried within each said annular chamber and seating against said flanges for urging said connectors toward each other and maintaining a substantially constant static tension load on the connecting cable control system, a pair of sleeves, each threadedly engaging one of said cable connectors, the threads on said sleeves being in the opposite screw sense and having a long lead angle whereby a small axial force exerted on the sleeves by said connectors will tend to cause sleeve rotation, a shaft engaging both said sleeves and allowing only axial movement thereof relative to the shaft, means carried by said shaft and limiting the relative axial movement of said sleeves, spring means acting between said shaft and said sleeves and urging the latter toward an extreme axial position adjacent the ends of said shaft with a force greater than the force required to effect sleeve rotation, whereby static tension regulation for the cable system is effected by rotation of said shaft rather than by axial movement of said sleeves relative to the shaft, and means carried by said housing and holding said shaft from rotating so long as the cable force exerted on one of said cable connectors is different from the cable force exerted on the other cable connector whereby a rigid mechanical connection is completed between said housing and only one of said cable connectors at a time for always maintaining a tension load on the cable system.

6. A cable tension maintainer for use in closed loop cable control systems, and the like, comprising a housing, a pair of cable connectors slidably carried by said housing, spring means acting between said housing and said connectors for maintaining a nearly constant static tension load on the cable system, and shaft means carried by said connectors and providing a rigid mechanical connection between said housing and only one of said cable connectors so long as the cable force exerted on one of said cable connector is different from the force exerted on the other whereby a tension load is always maintained on both cable connectors even though the cable may change in length.

7. A cable tension maintainer for use in closed loop cable control systems, and the like, comprising a generally tubular housing, a pair of opposed cable connectors slidably received by opposite ends of said housing for limited axial movement relative thereto, flanges carried on said housing and on said cable connectors and forming an annular chamber between the housing and each said cable connector, a low rate mechanical compression spring carried within each said annular chamber and seating against said flanges for urging said connectors toward each other and maintaining a substantially constant static tension load on the connecting cable control system, a pair of sleeves, each threadedly engaging one of said cable connectors, the threads on said sleeves being in the opposite screw sense and having a long lead angle whereby a small axial force exerted on the sleeves by said connectors will tend to cause sleeve rotation, a shaft engaging both said sleeves and allowing only axial movement thereof relative to the shaft, means carried by said shaft and limiting the relative axial movement of said sleeves, spring means acting between said shaft and said sleeves and urging the latter toward the extreme axial position adjacent the ends of said shaft with a force greater than the force required to effect sleeve rotation, whereby static tension regulation for the cable system is effected by rotation of said shaft rather than by axial movement of said sleeves relative to the shaft, means carried by said housing and holding said shaft from rotating so long as the cable force exerted on one of said cable connectors is different from the cable force exerted on the other cable connector whereby a rigid mechanical connection is completed between said housing and only one of said cable connectors at a time for always maintaining a tension load on the cable system, and spring assist means carried by said shaft and exerting an axial force on said sleeves only when the latter are in the extreme position adjacent the ends of said shaft.

8. A cable tension maintainer for use in closed loop cable control systems, and the like, comprising a generally tubular housing for transmitting control forces to the control system, a pair of opposed cable connectors slidably received within opposite ends of said housing for limited axial movement relative thereto, flanges carried on said housing and on said cable connectors and forming an annular chamber between the housing and each said cable connector, a low rate mechanical compression spring carried within each said annular chamber and seating against said flanges for urging said connectors toward each other and maintaining a substantially constant static tension load on the connecting cable control system, an axial bore formed in each said cable connector within said housing, a sleeve threadedly engaging each said connector within said bore, the threads on said sleeves being in the opposite screw sense and having a long lead angle whereby a small axial force exerted on the sleeves by said connectors will tend to cause sleeve rotation, a shaft concentrically arranged within said housing and slidably engaging both said sleeves and allowing only axial movement thereof relative to the shaft, means carried by said shaft and limiting the relative axial movement of said sleeves, spring means acting between said shaft and said sleeves and urging the latter toward an extreme axial position adjacent the ends of said shaft with a force greater than the force required to effect sleeve rotation whereby static tension regulation for the cable system is effected by rotation of said shaft rather than by axial movement of said sleeves relative to the shaft, and brake means responsive to relative axial movement between said housing and said shaft for holding the latter fixed with respect to said housing whereby a rigid mechanical connection is made with one of said cable connectors for transmitting the control forces directly to the cable system while allowing movement of the other cable connector for maintaining all cable segments in the control system under tension.

9. A slack adjusting tension regulator device for aircraft control surface actuators, and the like, having a closed loop cable control system comprising a housing for transmitting control forces to the control system, a pair of opposed cable connectors slidably received by said housing and forming a part of the cable system, spring means acting between said housing and said pair of cable connectors and imposing a static tension load on the cable system, and means responsive to a difference in the tension load on the connectors for locking only the connector subjected to the highest tension load with the housing whereby control forces applied to the housing are transmitted directly to the cable system, bypassing said spring means while the other connector remains operative to compensate for changes in cable length and maintain a tension load on the cable system.

10. A slack adjusting tension regulator device for aircraft control surface actuators and the like having a closed loop cable system comprising, a housing for transmitting control forces to the control system, a pair of opposed cable connectors slidably received within said housing, means allowing only axial movement of said cable connectors relative to said housing, spring means carried within said housing and urging both said cable connectors toward each other for maintaining a substantially constant static tension load on the connecting cable system, a shaft carried by said cable connectors within said housing and being rotatable relative to the cable connectors for allowing movement of the cable connectors to compensate for changes in cable length, a pair of sleeves, each engaging a cable connector and allowing restrained axial movement thereof in one direction only relative to the sleeve independently of the rotation of said shaft, and brake means responsive to relative axial movement between said housing and said shaft for holding the latter fixed with respect to said housing whereby a rigid mechanical connection is made with one of said cable connectors for transmitting the control forces directly to the cable system while allowing relative axial movement between the other cable connector and said shaft for maintaining all cable segments in the control system under tension.

11. A slack adjusting tension regulator device for aircraft control surface actuators, and the like, having a closed loop cable system comprising, a housing for transmitting control forces to the control system, a pair of opposed cable connectors slidably received within said housing, means carried on said housing and allowing only axial movement of said cable connectors relative to said housing, spring means carried within said housing and urging both said cable connectors toward each other for maintaining a substantially constant static tension load on the connecting cable system, a pair of sleeves, each carried by a cable connector, a common shaft engaging both said sleeves, said sleeves being threaded in the opposite screw sense for allowing relative axial movement between said cable connectors in response to rotation of said shaft, brake means carried by said housing and being responsive to relative movement between the housing and said shaft for holding the latter fixed with respect to said housing, and sleeve restraining means allowing relative axial movement of a cable connector relative to said shaft only between fixed limits whereby a rigid mechanical connection may be made between said housing and only one of said cable connectors at a time for transmitting control forces directly to the cable system, said restraining means including means urging said sleeves into an extreme axial position with a force greater than the axial force required to be exerted by said spring means for effecting rotation of said shaft when disengaged from said brake means.

12. A slack adjusting tension regulator device for aircraft control surface actuators, and the like, having a closed loop cable system comprising, a housing for transmitting control forces to the cable system, a pair of cable connecting members slidably received within said housing, spring means acting between said housing and said cable connecting members for maintaining a substantially constant static tension load on said cable system, a pair of sleeve members, each carried by a cable connecting member for axial movement relative thereto, a shaft engaging both said sleeve members and normally allowing movement of said cable connecting members for regulating cable tension, and means responsive to relative axial movement between said shaft and said housing for automatically locking said shaft to both said housing and one of said cable connecting members through the associated sleeve member whereby a control force applied to said housing is transmitted directly to the cable system, the sleeve member associated with the other of said cable connecting members being responsive to a force exerted by said spring means when said shaft is locked for allowing relative axial movement between the other cable connector and said shaft for maintaining a positive tension load on the cable system at all times.

13. A slack adjusting tension regulator device for aircraft control surfaces and the like, having a closed loop cable system comprising, a housing for transmitting control forces to the cable system, two pairs of generally tubular members, one pair being telescopically arranged within said housing adjacent one end thereof and the other pair being telescopically arranged within the opposite end thereof, a shaft connecting with both said pairs of tubular members, screw means allowing relative axial movement between said pairs of tubular members by rotation of said shaft, restraining means allowing limited axial movement of at least one of said tubular members in each pair relative to said shaft, brake means responsive to relative axial movement between said housing and said shaft for effecting a rigid mechanical connection between said housing and only one of said pairs of tubular members at a time, allowing at least one of the tubular members in the other pair to move axially relative to said shaft, means connecting one tubular member in each pair with the cable in said cable system, and spring means acting between said housing and said pairs of tubular members for always maintaining the cable under a tension load.

References Cited in the file of this patent

UNITED STATES PATENTS

| | | |
|---|---|---|
| 1,935,715 | Hunt et al. | Nov. 21, 1933 |
| 2,298,611 | Bruderlin | Oct. 13, 1942 |
| 2,417,581 | Aldred | Mar. 18, 1947 |
| 2,581,080 | Cushman | Jan. 1, 1952 |
| 2,661,631 | Myers | Dec. 8, 1953 |